United States Patent Office 3,161,680
Patented Dec. 15, 1964

3,161,680
N-ALKYL-N-BENZYL-β-THIOPROPIONAMIDES
James M. McManus, Uncasville, Conn., assignor to Chas. Pfizer & Co., Inc., New York, N.Y., a corporation of Delaware
No Drawing. Filed May 18, 1962, Ser. No. 195,962
12 Claims. (Cl. 260—562)

This invention relates to new and useful N-alkyl-N-benzyl-β-thiopropionamides which are valuable therapeutic agents. It is more particularly concerned with various substituted N-alkyl-N-benzyl-β-alkyl and alkenylthiopropionamides, with the sulfinyl and sulfonyl derivatives thereof, and with methods of inducing muscular relaxation in a subject by administration of said compounds. There is also included within the scope of this invention pharmaceutical compositions containing these N-benzyl-β-thiopropionamides as the essential active ingredient together with diluent amounts of pharmaceutically acceptable inert carriers.

The instant invention contemplates compounds of the formula

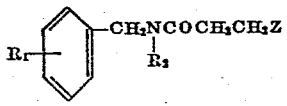

wherein $R_1$ is selected from the group consisting of hydrogen, chloro, bromo, iodo, fluoro and trifluoromethyl; $R_2$ is lower alkyl having up to about 2 carbon atoms; And Z is selected from the group consisting of lower alkylthio, lower alkylsulfinyl, lower alkylsulfonyl, said lower alkyl groups having up to about 4 carbon atoms, 2-propenylthio, 2-propenylsulfinyl, 2-propenylsulfonyl, methyl-2-propenylthio, methyl-2-propenylsulfinyl, methyl-2-propenylsulfonyl, 3-butenylthio, 3-butenylsulfinyl and 3-butenylsulfonyl.

Among typical member compounds are such novel, substituted N-benzyl-β-thiopropionamides as: N-methyl-N-benzyl-β-n-butylthiopropionamide; N-methyl-N-benzyl-β-(2-propenylthio)propionamide; N-methyl-N-(2-chlorobenzyl)-β-ethylthiopropionamide; N-methyl-N-(2-chlorobenzyl)-β-ethylsulfonylpropionamide; N-methyl-N-(2-chlorobenzyl)-β-ethylsulfonylpropionamide; N-methyl-N-(2-chlorobenzyl)-β-n-propylthiopropionamide; N-methyl-N-(2-chlorobenzyl)-β-(2-propenylthio)propionamide; N-methyl-N-(4-chlorobenzyl)-β-n-propylthiopropionamide; N-methyl-N-(4-chlorobenzyl)-β-(2-propenylthio)propionamide; N-methyl-(4-chlorobenzyl)-β-n-butylsulfinylpropionamide; N-methyl-N-(4-trifluoromethylbenzyl)-β-n-propylthiopropionamide and N-methyl-N-(4-trifluoromethylbenzyl)-β-n-propylsulfonylpropionamide.

The advantages afforded by the substituted benzyl-β-thiopropionamides of this invention are manifold; they may be administered orally, thus eliminating the parenteral route which is often painful and irritating, and they are valuable to an effective degree in the treatment of muscular disorders in animals, including humans, for sustained periods of time.

A convenient preparative method for the compounds of the instant invention involves first, the reaction of an N-alkyl-N-benzylamine with a β-halopropionyl halide, then reaction of the intermediate formed thereby with an alkyl or alkenylthiol. Other methods of synthesis involve the reaction of an N-alkyl-N-benzylamine with a β-alkyl- or β-alkenylthiopropionyl halide, or the reaction of alkali metal salt of an N-alkyl-N-benzyl-thiopropionamide with an alkyl or alkenyl halide. Still other methods useful for the preparation of the thio compounds of the instant invention will be obvious to those skilled in the art.

The preparation of the sulfinyl, i.e., SO, and the sulfonyl, i.e., SO₂, derivatives contemplated in the present invention can be conveniently accomplished by oxidation of the corresponding thio, i.e., S-containing N-benzyl-β-thiopropionamides as by treatment with, for example, hydrogen peroxide or potassium permanganate. This reaction can be carried out in the stepwise manner represented by the following equation:

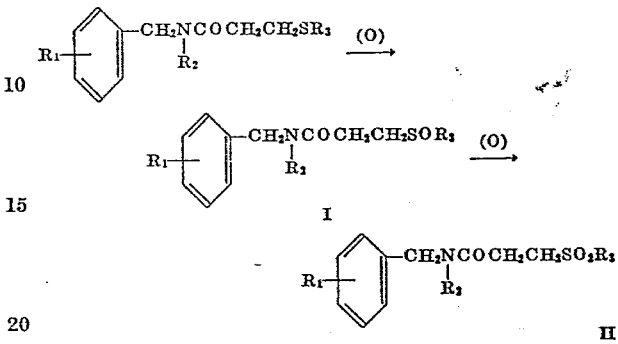

wherein $R_1$ and $R_2$ have the meanings described above and $R_3$ is lower alkyl of up to about 4 carbon atoms, 2-propenyl, methyl-2-propenyl or 3-butenyl. Thus, the sulfinyl compound, I, is prepared by treatment of the thio compound with an amount of oxidizing agent sufficient to carry the reaction to this degree of oxidation and no further. As is obvious, this should be no more than one molar equivalent oxygen based on the thio compound. The sulfonyl compound, II, on the other hand, is formed in the presence of enough oxidizing agent (i.e., at least 2 molar equivalents of oxygen based on the thio compound) to oxidize the thio group beyond the sulfinyl form completely to the sulfonyl form or, alternatively, the sulfonyl compound is prepared by treatment of the sulfinyl compound with oxidizing agent. Another method for obtaining the sulfinyl derivative is by partial reduction of the corresponding sulfonyl compound as with lithium aluminum hydride, or the like.

A particularly convenient synthetic route for preparation of the N-alkyl-N-benzyl-β-alkylthiopropionamides of the present invention (for convenience, reference to alkylthio hereinafter is to be understood to contemplate alkylthio and alkenylthio as well) involves reaction of a suitably substituted N-alkyl-N-benzylamine with the appropriate β-halopropionyl halide followed by reaction of the intermediate formed thereby with the appropriate alkylthiol.

These reactions can be represented by the following equations:

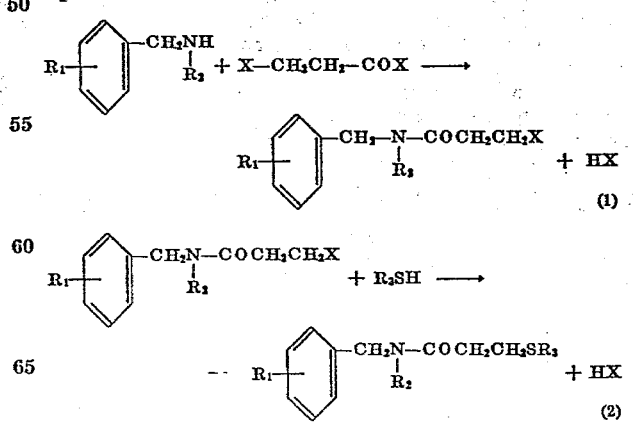

wherein $R_1$, $R_2$ and $R_3$ are defined as aforementioned and X represents a halogen radical as, for example, bromo, chloro and iodo.

The reaction represented by Equation 1 is preferably conducted in the presence of an inert non-polar organic solvent, that is, a solvent which is inert with respect to reaction with the intermediates. Typical examples of useful solvents are benzene, hexane, cyclohexane, and the like. It is desirable that aforementioned solvents be present in an amount at least sufficient to dissolve the reactants which are preferably in the ratio of at least 2 mols of amine per mol of acid halide.

Generally the reaction represented by Equation 1 is carried out at a temperature range of 20 to 150 degrees C. for times of ½ to 30 hours although these are not critical but are preferred ranges. The intermediate halopropionamide can be recovered by filtration of the by-product amine hydrochloride followed by evaporation of the reaction solvent. The product may be further purified by distillation, although this has not been found to be necessary in most instances, and the residual oil may be used directly as a starting material for the reaction represented by Equation 2.

The treatment of the alkyl-N-benzyl-$\beta$-chloropropionamides with an alkylthiol (Equation 2) is preferably carried out in an inert, polar organic solvent. Particularly useful for this purpose are lower alkanols, for example, methanol, ethanol, isopropanol, and the like. The reaction represented by Equation 2 can be carried out at temperatures from 20 to 150 degrees for times of ½ to 30 hours although these are not critical but are only preferred ranges. The products are conveniently recovered by evaporation of the solvent, addition to the residue of about 10 volumes of water and extraction of the oil which separates with a non-polar solvent such as ether or benzene. The solution of product in the non-polar solvent is dried and filtered and, after evaporation of the solvent, the residue is distilled to obtain the N-alkyl-N-benzyl-$\beta$-alkylthiopropionamide.

The yield of product, in the processes described hereinabove, is enhanced by the addition of a hydrogen halide, that is, hydrogen chloride or hydrogen bromide, acceptor to the reaction mixtures. By "hydrogen halide acceptor," as employed herein, is meant a substance which will convert hydrogen halide to an unreactive state so that it will not be available to react with the desired product. As is obvious, hydrogen halide, HX, is a by-product of both reactions represented by Equations 1 and 2. While the excess of amine reactant employed in the reaction represented by Equation 1 acts as the hydrogen halide acceptor, in fact, many hydrogen halide acceptors may be employed in this process and in that represented by Equation 2. For example, there can be used metal salts of organic acids such as lower alkanoic acids, namely, acetic, propionic, and the like; organic tertiary amines, such as pyridine, triethylamine, and the like; and metal oxides and hydroxides as well as metal salts of weak inorganic acids, for example, carbonic acid. Particularly effective are the alkali and alkaline earth metal salts of carbonic acid, namely, carbonate and bicarbonate salts. By alkali metal as employed herein is meant sodium, potassium and lithium; alkaline earth metal, barium, calcium, strontium and magnesium. The above carbonate salts are preferred since, on reaction with the by-product hydrogen halide, they form carbon dioxide, water and the appropriate metal halide. Further, these salts are very economical and readily available. The salts may be employed in an amount theoretically required to react with the hydrogen halide liberated in the present process. In reality, the amount of hydrogen halide acceptor employed is not critical. Usually, a large molar excess is employed, especially if it is insoluble in the reaction mixture. The large molar excess, as much as 10 times the theoretical amount, provides for a more efficient reaction with the hydrogen halide. However, a hydrogen halide acceptor is not required to obtain the products of the present invention, since appreciable yields of product can be obtained in its absence.

The preparation of the sulfinyl derivatives contemplated by this invention is preferably carried out in polar, organic solvents; especially useful are acetone, glacial acetic acid or mixtures of the two and it is preferred to use acetone containing a small amount of acetic acid. To prepare the sulfinyl derivatives the corresponding thio compounds prepared as hereinbefore described are dissolved in said polar, organic solvent to obtain a solution containing about 10 percent by weight of the thio compounds. The solution is then treated with a 1.0 mol ratio of 30 percent hydrogen peroxide and the reaction mixture is kept at about 20–30 degrees C. for about 16 hours, then is heated to 90–100 degrees C. for about 30 minutes. It is to be understood that these ranges are not critical but only preferred. The sulfinyl compound can be recovered by evaporation of the solvent and can be purified by recrystallization from a lower alkanol.

The preparation of the sulfonyl derivatives contemplated by this invention is preferably carried out in polar, organic solvents; especially useful is glacial acetic acid. A solution of the respective thio compounds of the instant invention is treated with a 5 percent aqueous solution of potassium permanganate in such amount that the mol ratio of permanganate to thio compound is at least 2.0 The permanganate solution is added at such a rate that the temperature of the reaction is maintained in the range of about 20 to 30 degrees C. although this is not critical but only preferred. The inorganic by-product solids are converted to soluble materials by the addition of aqueous sodium bisulfite and, if the product has not precipitated, it is caused to precipitate by the addiiton of two to 10 volumes of water. The sulfonyl derivatives are recovered by filtration and can be purified by recrystallization from lower alkanol.

The starting materials used in preparing the compounds contemplated by this invention are compounds which are either commercially available or are well known in the prior art. For instance, N-alkyl-N-benzylamines can either be commercially obtained or else they can be readily prepared as by reduction of the Schiff base prepared by reaction of a suitably substituted benzyldehyde with monomethyl- or monoethylamine. Suitable means for accomplishing this reduction involve platinum-catalyzed hydrogenation, treatment with sodium and alkanol or treatment with lithium aluminum hydride. An equally convenient route to the N-alkylbenzylamines involves reaction of a suitably substituted benzyl halide with an excess of monomethyl- or monoethylamine.

Another starting material, $\beta$-halo propionyl halide, is commercially available or may be readily prepared. For example, a particularly convenient preparation of $\beta$-chloropropionyl chloride involves treatment of $\beta$-priopiolactone with aqueous sodium chloride and then treating the $\beta$-chloropropionic acid thus formed with thionyl chloride.

The thiol intermediates are commercially available or can be readily prepared. For example, a suitably substituted alkyl halide may be treated with thiourea and the S-alkylthiouronium salt formed thereby may be decomposed with alkali to give the desired alkylthiol. Alternatively, a suitably substituted alkyl halide may be reacted with a metallic hydrosulfide, for example, sodium hydrosulfide, and the desired alkylthiol formed thereby.

The present new therapeutic agents are effective as muscle relaxants. They are useful as tranquilizers and in the treatment of the symptoms of muscular disorders such as bursitis, rheumatism, spasiticity, strains and the like. When administered by the intraperitoneal route to mice, the L.D.$_{50}$ is 600–1000 mg./1 kg. of body weight. The therapeutic effectiveness of the present agents is found to be of appreciable duration which makes them valuable in the treatment of muscle disorders.

The compounds of the present invention are conveniently administered in composition form. Such compositions include a pharmaceutical carrier, selected on the basis of the chosen route of administration and standard pharmaceutical practice. For example, they may be administered orally in the form of tablets containing such excipients as starch, milk, sugar, certain types of clay, etc. They may be administered in capsules, in admixtures with the same or equivalent excipients. They may also be administered orally in the form of oral suspensions which may contain flavoring and coloring agents. They may be injected parenterally, i.e. for example, intramuscularly or subcutaneously. For oral administration of the therapeutic agents of this invention, tablets or capsules containing from about 25 to about 200 mg. are suitable for most applications.

The following examples are given by way of illustration and not to be construed as limitations of this invention, many variations of which are possible without departing from the spirit or scope thereof.

EXAMPLE I

*N-Methyl-N-(2-Chlorobenzyl)-β-Chloropropionamide*

To a solution of 100 g. (0.645 mol) of N-methyl-2-chloro-benzylamine in 300 ml. of dry benzene was added dropwise 40.7 g. (0.323 mol) of β-chloropropionyl chloride with stirring and cooling. After allowing the reaction mixture to stand overnight at room temperature, it was heated on a steam bath for twenty minutes. The mixture was cooled and the by-product amine hydrochloride was removed by filtration and washed with 100 ml. of benzene. The benzene washing was combined with the original filtrate and the solvent was removed in vacuo leaving 74 g. (93% yield) of N-methyl-N-(2-chlorobenzyl)-β-chloropropionamide, a yellow oil.

This procedure is used to prepare the following N-alkyl-N-benzyl-β-chloropropionamides from corresponding substituted N-alkylbenzylamines and β-chloropropionyl chloride:

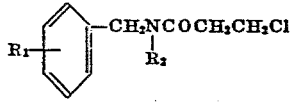

| $R_1$ | $R_2$ |
|---|---|
| H | $CH_3$ |
| H | $CH_2CH_3$ |
| 2-Br | $CH_3$ |
| 2-I | $CH_3$ |
| 2-F | $CH_2CH_3$ |
| 3-Cl | $CH_3$ |
| 4-F | $CH_3$ |
| 3-Cl | $CH_2CH_3$ |
| 4-Cl | $CH_3$ |
| 4-Cl | $CH_2CH_3$ |
| 2-$CF_3$ | $CH_3$ |
| 2-$CF_3$ | $CH_2CH_3$ |
| 3-$CF_3$ | $CH_3$ |
| 3-$CF_3$ | $CH_2CH_3$ |
| 4-$CF_3$ | $CH_3$ |
| 4-$CF_3$ | $CH_2CH_3$ |

EXAMPLE II

*N-Methyl-N-(2-Chlorobenzyl)-β-Ethylthiopropionamide*

To a mixture of 8.0 g. (0.129 mol) of ethanethiol and 13.8 g. (0.1 mol) of anhydrous potassium carbonate in 110 ml. of absolute ethanol was added 24.4 g. (0.1 mol) of N-methyl-N-(2-chlorobenzyl)-β-chloropropionamide. The reaction mixture was stirred at room temperature for one hour and was then refluxed on a steam bath for one and one-half hours. The ethanol was removed in vacuo and the residue was cooled and 150 ml. of cold water was added. The heavy oil which separated was extracted into ether and the ethereal layer was separated and dried over sodium sulfate. Removal of the drying agent and concentration of the ether left an oil. After distillation there was obtained 23 g. (85% yield) of N-methyl-N-(2-chlorobenzyl)-β-ethylthiopropionamide, B.P. 147–148°/0.2 mm.

*Analysis.*—Calcd. for $C_{13}H_{18}ONSCl$: C, 57.44; H, 6.67; N, 5.15. Found: C, 57.7; H, 6.7; N, 5.1.

EXAMPLE III

*N-Methyl-N-(4-Chlorobenzyl)-β-n-Propylthiopropionamide*

A mixture of 12.3 g. (0.5 mol) of N-methyl-N-(4-chlorobenzyl)-β-chloropropionamide, 4.57 g. (0.06 mol) of propanethiol and 69 g. (0.05 mol) of potassium carbonate in 60 ml. of absolute ethanol was stirred at room temperature for one hour and at reflux temperature for two hours. The reaction was allowed to cool and the ethanol removed in vacuo. Water (150 ml.) was added and the oil which separated was extracted into ether. The ether layer was separated and dried over sodium sulfate. Removal of the ether and distillation of the residue gave 10.0 g. (70% yield) of N-methyl-N-(4-chlorobenzyl)-β-n-propylthiopropionamide, B.P. 169–171°/6 mm.

*Analysis.*—Calcd. for $C_{14}H_{20}ONSCl$: C, 58.82; H, 7.05; N, 4.90. Found: C, 57.0; H, 6.3; N, 5.2.

EXAMPLE IV

*Preparation of N-Methyl-N-Benzyl-β-n-Butylthiopropionamide*

The procedure of Example II was followed substituting N-methyl-N-benzyl-β-chloropropionamide for the 2-chlorobenzyl compound and substituting n-butanethiol for ethanethiol. N-methyl-N-benzyl-β-n-butylthiopropionamide was obtained; this compound had a boiling point of 162–163 degrees C. at 0.2 mm. Hg.

*Analysis.*—Calcd. for $C_{15}H_{23}ONSCl$: C, 67.9; H, 8.7; N, 5.3. Found: C, 67.8; H, 8.8; N, 5.3.

EXAMPLE V

*Preparation of N-Methyl-N-Benzyl-β-(2-Propenylthio)Propionamide*

This compound is prepared by the procedure of Example II employing N-methyl-N-benzyl-β-chloropropionamide in place of the corresponding chlorobenzyl compounds and 2-propenethiol in place of ethanethiol. The product has a boiling point of 158–159 degrees C. at 0.4 mm. Hg.

*Analysis.*—Calcd. for $C_{14}H_{19}ONSCl$: C, 67.4; H, 7.7; N, 5,6. Found: C, 66.8; H, 8.1; N, 5.4.

EXAMPLE VI

*Preparation of N-Methyl-N-(2-Chlorobenzyl)-β-(2-Propenylthio)Propionamide*

This compound is prepared by the procedure of Example II employing 2-propenethiol in place of the corresponding ethanethiol. The product has a boiling point of 165–176 degrees C. at 0.5 mm. Hg.

*Analysis.*—Calcd. for $C_{14}H_{18}ONSCl$: C, 59.2; H, 6.4; N, 4.9. Found: C, 58.5; H, 6.5; N, 4.8.

EXAMPLE VII

*Preparation of N-Methyl-(4-Chlorobenzyl)-β-(2-Propenylthio)Propionamide*

This compound is prepared by the procedure of Example II employing N-methyl-N-(4-chlorobenzyl)-β-chloropionamide in place of the corresponding 2-chloro compound and 2-propenethiol in place of the corresponding ethanethiol. The product has a boiling point of 179–180° C. at 0.4 mm. Hg.

*Analysis.*—Calcd. for $C_{14}H_{18}ONSCl$: C, 59.2; H, 6.4; N, 4.9. Found: C, 58.8; H, 6.5; N, 4.6.

EXAMPLE VIII

*Preparation of N-Methyl-(4-Chlorobenzyl)-β-n-Butylthiopropionamide*

This compound is prepared by the procedure of Example II employing N-methyl-N-(4-chlorobenzyl)-β-chloropionamide in place of the corresponding 2-chloro compound and n-butanethiol in place of the corresponding ethanethiol. The product has a boiling point of 178 to 179 degrees C. at 0.2 mm. Hg.

*Analysis.*—Calcd. for $C_{15}H_{22}ONSCl$: C, 60.1; H, 7.4; N, 4.7. Found: C, 59.6; H, 7.4; N, 4.7.

This procedure is used to prepare the following substituted N-alkyl-N-benzyl-β-alkylthiopropionamides.

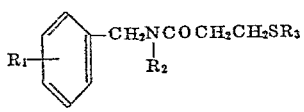

| R₁ | R₂ | R₃ |
|---|---|---|
| H | CH₃ | CH₂CH₃ |
| H | CH₂CH₃ | CH₃ |
| 2-F | CH₃ | CH₂CH₂CH₃ |
| 4-F | CH₃ | CH₂CH=CHCH₃ |
| 3-CF₃ | CH₃ | CH(CH₃)CH=CH₂ |
| 4-CF₃ | CH₂CH₃ | CH₂C(CH₃)=CH₂ |
| 4-CF₃ | CH₃ | CH₂CH₂CH₃ |
| 4-CF₃ | CH₃ | CH₂CH₂CH₃ |
| 2-Br | CH₃ | CH₂CH₃ |
| 2-I | CH₃ | CH₂CH₃ |
| 2-Cl | CH₃ | CH₂CH₂CH₃ |
| 2-Cl | CH₃ | CH₂CH₂CH₃ |
| 3-Cl | CH₂CH₃ | CH₂CH₂CH₂=CH₂ |
| 4-Cl | CH₃ | CH₂CH₃ |

EXAMPLE IX

*Preparation of N-Methyl-N-(2-Chlorobenzyl)-β-Ethylsulfinylpropionamide*

N - methyl - N - (2-chlorobenzyl)-β-ethylthiopropionamide, 0.05 mol. is dissolved in a mixture of 125 ml. of acetone and 25 ml. of glacial acetic acid. To this solution at 25 degrees C. is added 30 percent hydrogen peroxide, 0.05 mole, and the resulting mixture is maintained at 25 degrees +5 degrees C. for 16 hours, then is heated for 30 minutes on a steam bath. The product is isolated by evaporation of the solvent and is recrystallized from ethanol.

EXAMPLE X

The remaining substituted N-alkyl-N-benbyl-β-alkylthio-propionamides of the previous examples are converted to the following N-alkyl-N-benzyl-β-alkylsulfinyl-propionamides:

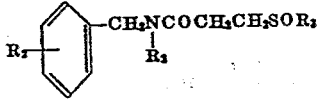

| R₁ | R₂ | R₃ |
|---|---|---|
| H | CH₃ | CH₂CH₃ |
| H | CH₂CH₃ | CH₃ |
| H | CH₃ | CH₂CH₂CH₃ |
| 2-F | CH₂CH₃ | CH₃ |
| 4-F | CH₃ | CH₂CH=CHCH₃ |
| 3-CF₃ | CH₃ | CH(CH₃)CH=CH₂ |
| 4-CF₃ | CH₃ | CH₂CH₂CH₃ |
| 2-Br | CH₃ | CH₂CH₂CH₃ |
| 2-I | CH₃ | CH₂CH₃ |
| 2-Cl | CH₃ | CH₂CH₂CH₃ |
| 4-CF₃ | CH₂CH₃ | CH₃C(CH₃)=CH₂ |
| 3-Cl | CH₂CH₃ | CH₂CH₂CH=CH₂ |
| 4-Cl | CH₃ | CH₂CH₃ |
| 4-Cl | CH₃ | CH₂CH₂CH₂CH₃ |

EXAMPLE XI

*Preparation of N-Methyl-N-(2-Chlorobenzyl)-β-Ethylsulfonylpropionamide*

Thirteen and six-tenths grams (0.05 mol) of N-methyl-N-(2-chlorobenzyl)-β-ethylthio-propionamide was added to 150 ml. of glacial acetic acid and the mixture cooled to 10 degrees C. To the cooled, stirred acetic acid solution was added 11.2 g. (0.09 mol) of potassium permanganate in 170 ml. of warm water at such a rate that the temperature of the reaction mixture was maintained between 20 and 30 degrees C. After the addition was complete, the excess permanganate was decomposed by the addition of sodium bisulfite solution. Filtration of the solid gave 11.5 g. of somewhat impure N-methyl-N-(2-chlorobenzyl)-β-ethylsulfonylpropionamide, M.P. 78–79 degrees. Recrystallization from isopropanol provided the purified product, 9.5 g. (62% yield), M.P. 78–79 degrees C.

*Analysis.*—Calcd. for $C_{13}H_{18}O_3NSCl$: C, 51.39; H, 5.97; N, 4.61. Found: C, 51.7; H, 6.1; N, 4.6.

EXAMPLE XII

*Preparation of N-Methyl-N-(4-Chlorobenzyl)-β-n-Butylsulfonylpropionamide*

This compound is prepared by the procedure of Example XI employing the 4-chlorobenzyl compound of Example VIII in place of the corresponding 2-chlorobenzyl compound. This product has a melting point of 71–72 degrees C.

*Analysis.*—Calcd. for $C_{15}H_{22}O_3NSCl$: C, 54.3; H, 6.7; N, 4.2. Found: C, 53.5; H, 6.4; N, 4.2.

EXAMPLE XIII

By the procedure of Example XI there is prepared N-methyl-N-(2-chlorobenzyl) - β - n-propylsulfonylpropionamide, M.P. 70–71 degrees C., when the properly substituted thio compound of Example VIII is substituted for the corresponding thio compound of Example XI. By this same procedure there is obtained N-methyl-N-benzyl-β-n-butylsulfonylpropionamide, melting at 61–62 degrees C., when the thio compound of Example IV is substituted for the corresponding thio compound used in Example XI.

EXAMPLE XIV

The remaining substituted N-alkyl-N-benzyl-β-alkylthiopropionamides of Examples III, V, VII and VIII are converted to the following N-alkyl - N - benzyl-β-alkylsulfonylpropionamides:

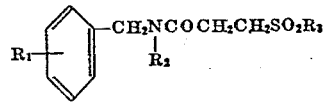

| R₁ | R₂ | R₃ |
|---|---|---|
| H | CH₃ | CH₂CH₃ |
| H | CH₂CH₃ | CH₃ |
| H | CH₃ | CH₂CH₂CH₃ |
| H | CH₃ | CH₂CH=CH₂ |
| H | CH₃ | CH₂CH=CH₂ |
| 2-F | CH₂CH₃ | CH₃ |
| 4-F | CH₃ | CH₂CH=CHCH₃ |
| 3-CF₃ | CH₃ | CH(CH₃)CH=CH₂ |
| 4-CF₃ | CH₂CH₃ | CH₃C(CH₃)=CH₂ |
| 4-CF₃ | CH₃ | CH₂CH₂CH₃ |
| 2-Cl | CH₃ | CH₂CH=CH₂ |
| 3-Cl | CH₂CH₃ | CH₂CH₂CH=CH₂ |
| 2-Br | CH₃ | CH₂CH₂CH₃ |
| 2-I | CH₃ | CH₂CH₃ |
| 4-Cl | CH₃ | CH₂CH₃ |
| 4-Cl | CH₃ | CH₂CH₂CH₃ |
| 4-Cl | CH₃ | CH₃CH=CH₂ |

EXAMPLE XV

A tablet base is prepared by blending the following ingredients in the proportion by weight indicated:

| | |
|---|---|
| Sucrose, U.S.P. | 82.0 |
| Tapioca Starch | 13.6 |
| Magnesium stearate | 4.4 |

Into this base is blended a sufficient amount of N-methyl-N-(2-chlorobenzyl)-β-(2 - propenylthio)propionamide to provide tablets each containing 25 mg. of active ingredient.

EXAMPLE XVI

Into the tablet base of Example XV is blended a sufficient amount of N-methyl-N-methyl-β-n-butylthiopropionamide to provide tablets containing 50 mg., 100 mg., and 200 mg. of active ingredient.

EXAMPLE XVII

Sesame oil is sterilized by heating at 120 degrees C. for 2 hours. To this oil a sufficient quantity of pulverized N-methyl-N-(4 - chlorobenzyl)-β-n-butylsulfonylpropionamide to make an 0.025% suspension by weight. The solid is thoroughly dispersed in the oil by use of a colloid mill. It is then filtered through a 100 to 250 mesh screen and poured into sterile vials.

EXAMPLE XVIII

Aqueous suspensions are prepared each containing 50 mg. per teaspoonful (5 ml.) of each of the above described N-alkyl-N-benzyl-β-alkylthiopropionamides and the sulfinyl and sulfonyl derivatives thereof in a vehicle composed of U.S.P. simple syrup containing the following materials per 100 ml. of vehicle:

F.D. and C. yellow No. 5 _____ mg__ 5
Carboxymethylcellulose, low-viscosity type ____ mg__ 1
Synthetic lemon flavor (Freitsche) _____ ml__ 0.1

These suspensions are particularly well adapted for oral administration of the active agent.

EXAMPLE XIX

To a commercially available raspberry-flavored sugar syrup is added the equivalent of 40 mg. of N-methyl-N-(2 - chlorobenzyl)-β-ethylsulfonylpropionamide per milliliter and the mixture is homogenized in a mechanical device for this purpose. This mixture is especially suitable for oral administration, containing 200 mg. of the active ingredient per teaspoonful (5 ml.).

What is claimed is:
1. A compound of the formula

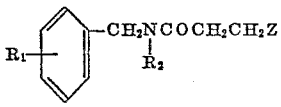

wherein
$R_1$ is selected from the group consisting of hydrogen, chloro, bromo, iodo, fluoro and trifluoromethyl;
$R_2$ is lower alkyl having up to about 2 carbon atoms; and Z is selected from the group consisting of lower alkylthio, lower alkylsulfinyl, lower alkylsulfonyl, said lower alkyl groups having up to about 4 carbon atoms, 2-propenylthio, 2-propenylsulfinyl, 2-propenylsulfonyl, methyl - 2 - propenylsulfinyl, methyl-2-propenylsulfonyl, 3 - butenylthio, 3 - butenylsulfinyl and 3-butenylsulfonyl.

2. A compound of the formula

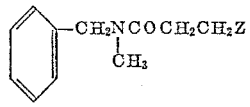

wherein Z is n-butylthio.

3. A compound of the formula

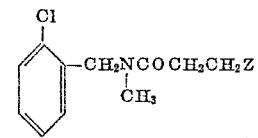

wherein Z is ethylthio.

4. A compound of the formula

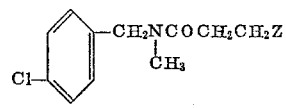

wherein Z is n-propylsulfonyl.

5. A compound of the formula

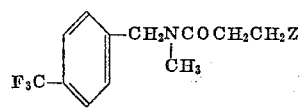

wherein Z is n-propylthio.

6. A compound of claim 1 wherein $R_1$ is hydrogen, $R_2$ is methyl and Z is 2-propenylthio.
7. A compound of claim 1 wherein $R_1$ is ortho-chloro $R_2$ is methyl and Z is ethylsulfonyl.
8. A compound of claim 1 wherein $R_1$ is ortho-chloro $R_2$ is methyl and Z is n-propylthio.
9. A compound of claim 1 wherein $R_1$ is ortho-chloro $R_2$ is methyl and Z is 2-propenylthio.
10. A compound of claim 1 wherein $R_1$ is para-chloro $R_2$ is methyl and Z is 2-propenylthio.
11. A compound of claim 1 wherein $R_1$ is para-chloro $R_2$ is methyl and Z is n-butylsulfinyl.
12. A compound of claim 1 wherein $R_1$ is para-trifluoromethyl, $R_2$ is methyl and Z is propylsulfonyl.

References Cited in the file of this patent
FOREIGN PATENTS 1,246,163  France _____ Oct. 10, 1960